United States Patent [19]

Legaré

[11] Patent Number: 4,914,830
[45] Date of Patent: Apr. 10, 1990

[54] TAPE MEASURING DEVICE

[76] Inventor: Marcel Legaré, 6310 Du Griffon #3, Charlesbourg, Quebec, Canada, G2J 1C6

[21] Appl. No.: 261,397

[22] Filed: Oct. 24, 1988

[30] Foreign Application Priority Data

Nov. 17, 1987 [CA] Canada .................................. 552020

[51] Int. Cl.⁴ ............................ G01B 3/10; B43L 9/04
[52] U.S. Cl. ........................................ 33/668; 33/768; 33/27.03; 33/760
[58] Field of Search ...................... 33/668, 138, 27.03, 33/761, 768, 769, 760, 770

[56] References Cited

U.S. PATENT DOCUMENTS

| | | |
|---|---|---|
| 1,613,676 | 1/1927 | Raphael . |
| 2,567,354 | 9/1951 | Schakel ................................... 33/42 |
| 2,859,525 | 11/1958 | Carlson .............................. 33/27.03 |
| 3,100,941 | 8/1963 | Taylor . |
| 3,148,455 | 9/1964 | Aciego . |
| 3,262,211 | 7/1966 | Beckett . |
| 3,336,678 | 8/1967 | Chamberlain et al. . |
| 4,015,337 | 4/1977 | Taylor . |
| 4,296,554 | 10/1981 | Hammerstrom .................. 33/668 X |

FOREIGN PATENT DOCUMENTS 1051580 9/1953 France .............................. 33/27.03

*Primary Examiner*—Harry N. Haroian
*Attorney, Agent, or Firm*—Larson and Taylor

[57] ABSTRACT

A tape measuring device comprising a graduated tape wound into a housing on which is mounted a holder for a marking device such as a pen or pencil. The holder comprises an arm hingedly mounted to the housing of the tape measuring device and defining a seat for receiving the pen or pencil such that the marking tip of the pen or pencil extends adjacent a longitudinal edge of the graduated tape when the latter is pulled from the housing.

14 Claims, 3 Drawing Sheets

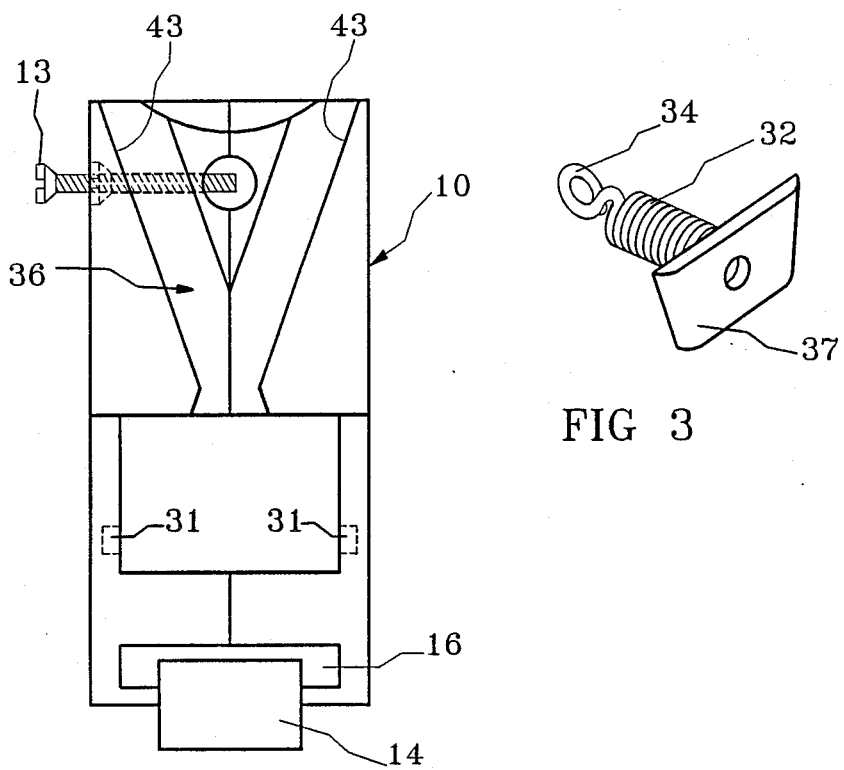
FIG 2
FIG 3
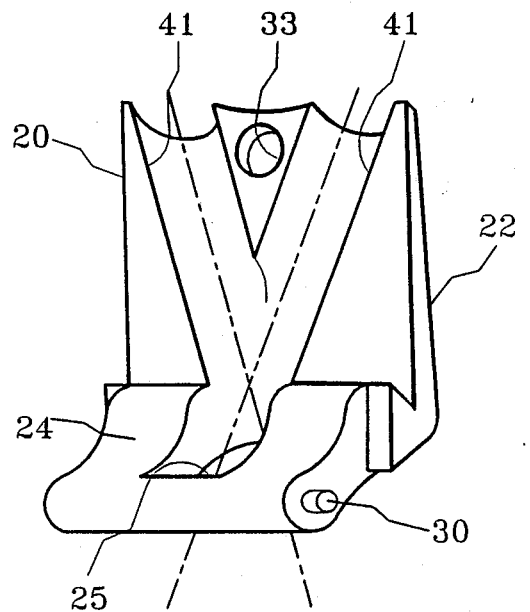
FIG 4

TAPE MEASURING DEVICE

FIELD OF THE INVENTION

The present invention relates to measuring tools and more particularly to a tape measuring device with a holder for a marking device such as a pane or pencil.

BACKGROUND OF THE INVENTION

Tape measuring devices are well known and extensively used in the construction industry and in various other related fields. A tape measuring device which has found wide acceptance among professionals comprises a graduated flexible steel tape wound onto a reel which is mounted into a housing made of any suitable material such as plastic or metal. The reel is controlled by a spring winding mechanism which maintains the tape into recoiled position, when not in use. To extend a length of tape out of the housing, a free end of the tape is manually pulled out against the resiliency of the winding mechanism. For convenience, it is customary to provide the tape measuring device with a stop button for blocking the graduated tape in extended position against the pulling force exerted by the winding mechanism. When it is desired to retract the tape, the stop is released and the tape is automatically pulled back in the housing.

It is common practice, when using a tape measuring device, to simultaneously measure and mark out the measured surface with a pen or pencil. With a tape measuring device of the type described above, this is achieved by holding with one hand the housing of the tape measuring device, while the other hand holds the free end of the graduated tape and the pen or pencil. Obviously, this operation is rather difficult to perform and requires a considerable degree of manual dexterity on the part of the worker.

OBJECT AND STATEMENT OF THE INVENTION

Therefore, an object of the present invention is an improved tape measuring device provided with a holder for a marking device, which is of a simple and inexpensive construction.

The object of the invention is achieved by providing a tape measuring device comprising a steel tape wound into a housing on which is hingedly mounted an arm for clamping against the housing a marking device such as a pen or pencil. The position of the arm is selected so that when the pen is clamped by the arm, its marking tip extends in front of the housing, on the side of the steel tape and adjacent the graduations thereon.

Preferably, the arm is urged toward the housing of the tape measuring device by a relatively strong spring to securely hold the pen or pencil in place, thus, preventing an accidental dislodgement and also to prevent the pen or pencil from sliding upwardly between the arm and the housing when pressure is exerted on the marking tip thereof.

In a preferred embodiment, the holder for the marking device provides a seat allowing to install the marking device in two different positions so that the marking tip thereof may be placed on either side of the graduated tape. This feature is extremely useful when one longitudinal edge of the tape has metric graduations and the opposite longitudinal edge has imperial graduations, thus, allowing the user to install the marking tip of the marking device adjacent the graduations of its choice.

Therefore, the present invention comprises in a general aspect a tape measuring device, comprising:
a housing;
an elongated graduated tape wound into the housing;
a slot formed on the housing through which protrudes an extremity of the graduated tape; and
a holder for a marking device having a marking tip, the holder including an arm hingedly mounted to the housing above the slot, the arm and the housing defining therebetween a seat for receiving the marking device wherein the marking tip thereof extends adjacent a longitudinal edge of the graduated tape when the latter is at least partially pulled out of the housing.

The invention also extends to a tape measuring device, comprising:
a housing;
an elongated graduated tape wound into the housing;
an opening formed on the housing through which protrudes an extremity of the graduated tape;
an arm pivotally mounted to the housing above the slot;
an elongated groove formed on the housing and facing the arm, the groove and the arm constituting holder means for a marking device including a marking tip, when the marking device is received in the groove the marking tip being adjacent a longitudinal edge of the graduated tape.

BRIEF DESCRIPTION OF THE DRAWINGS

FIG. 2 is a front view of the tape measuring device, according to the invention, the arm for retaining the marking device against the housing, being omitted;

FIG. 3 is a perspective view of a coil spring for urging the arm toward the housing of the tape measuring device;

FIG. 4 is a perspective view of the arm for retaining the marking device against the housing.

DESCRIPTION OF A PREFERRED EMBODIMENT

Figure 1:
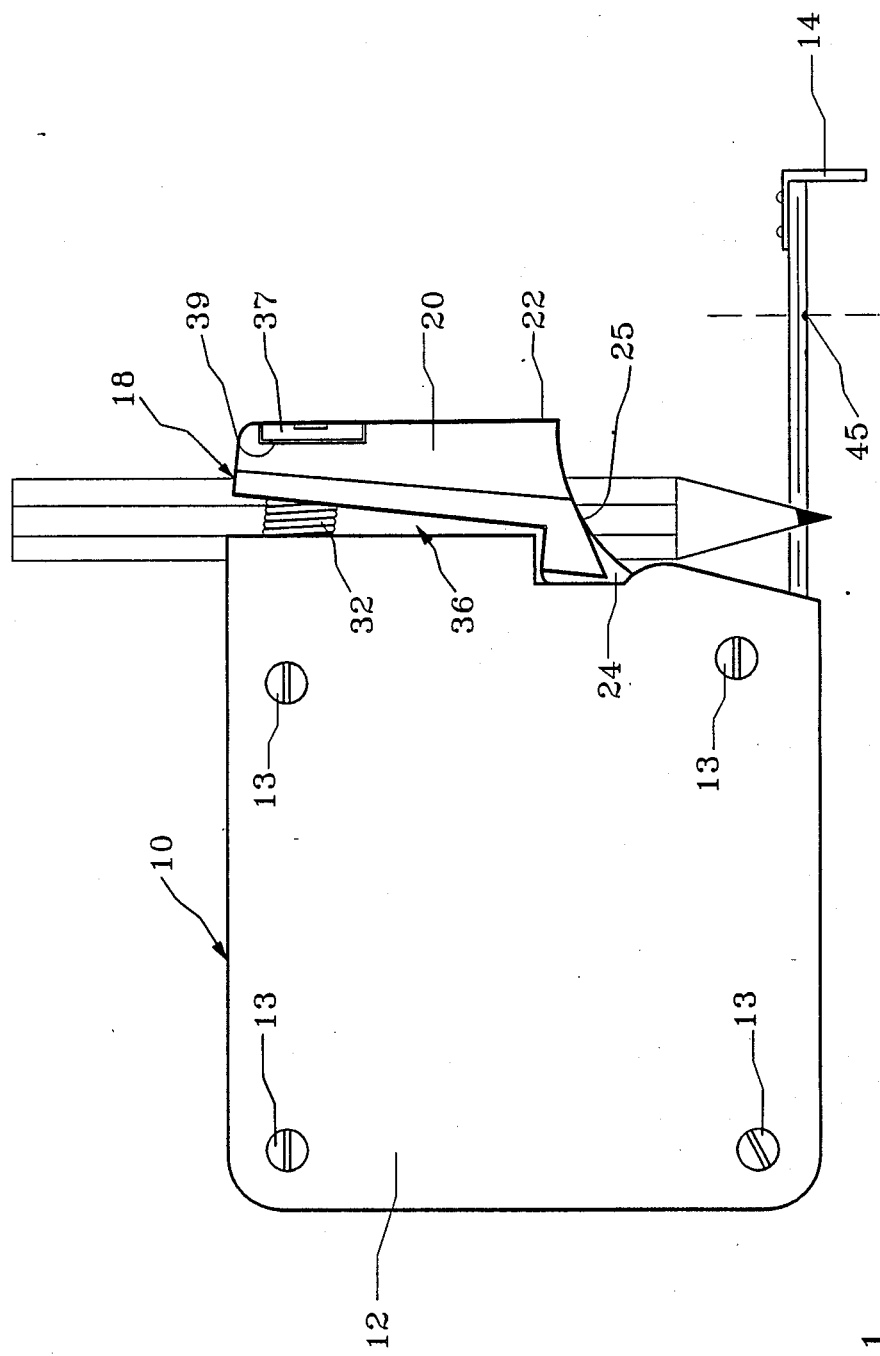
FIG. 1 is a side view of a tape measuring device according to the present invention.

FIG. 1 of the annexed drawings illustrates a tape measuring device constructed in accordance with the present invention. The tape measuring device, identified generally by the reference numeral 10 comprises a housing 12 of somewhat rectangular shape, made of plastic, metal or other suitable material in which is enclosed a graduated steel tape wound onto a reel which is not shown in the drawings because it is well known in the art. The housing 12 is made of two halves meeting along a vertical plane and attached to each other by screws 13 positioned at the corners of the housing 12.

When not in use, the steep tape is maintained in recoiled position by a winding mechanism or the like (not shown in the drawings), well known in the art.

The free end of the graduated tape extends through a slot 16 (best shown in FIG. 2) outside the housing 12 of the tape measuring device and it is provided with a tab 14 abutting against the housing 12 and preventing the free end of the graduated tape to be completely pulled by the winding mechanism within the housing 12. The tab 14 also facilitates grasping of the free end of the tape to enable a user to withdraw the same from the housing 12.

The tape measuring device 10 is also provided with a stop mechanism (not shown in the drawings) to enable the graduated tape to be maintained in extended position and to prevent the winding mechanism from pulling back the tape in the housing 12. Such stop mechanism is well known to those skilled in the art and for that reason it will not be described in detail here.

As it is customary in the art, the steel tape is graduated both in metric and imperial measures. As an example, one of the longitudinal edges of the tape is graduated in centimeters, while the opposite longitudinal edge is graduated in inches, although other graduations may be envisaged.

The tape measure 10 comprises a holder 18 for retaining a marking device such as a pen or pencil (a pencil in the illustrated example) to the housing 12. More particularly, the holder 18 includes an arm 20, as best shown in FIG. 4, having a central portion 22 and a depending leg 24. An opening 25 is formed between the leg 24 and the central portion 22 of the arm 20 through which extends the marking device.

The central portion 22 stops at midheight of the housing 12, as best shown in FIG. 1, while the leg 24 extends further downwardly, within the housing 12 and is provided at its lower end with a metallic pin 30, whose ends are received into recesses 31 formed on the housing 12 (see FIGURE 2).

The arm 20 is maintained against the housing 12 by means of a resilient element such as a coil spring 32, passing through an opening 33 in the arm 20 and being retained to the arm 20 by a plate-like member 37 that fits into a seat 39 formed on the frontal surface of the arm 20. An opposite end of the coil spring 32 is provided with a loop 34 in which fits the screw 13, on the corresponding upper corner of the housing 12, for retaining the spring 32 to the housing 12.

Between the arm 20 and the housing 12 of the tape measuring device 10 is formed a seat 36 adapted to receive the marking device. The seat 36 is such as to enable the marking device to be installed in two different positions, as it will be explained hereinafter. The seat 36 is split along the meeting plane between the arm 20 and the housing 12 and it is formed by providing a first pair of semi-circular grooves 41 on the arm 20 having a V-shaped configuration and a second pair of grooves 43 formed on the housing 12, also having a V-shaped configuration. The pairs of grooves 41 and 43 face each other to define the seat 36.

The operation of the tape measuring device 10, according to the present invention is as follows. To insert a pen or pencil in the holder 18, the arm 20 is pulled away from the housing 12, the pin or pencil is placed in one of the arms of the V of the seat 36 and it is passed through the opening 25 in the arm 20. Depending upon which one of the arms of the V is selected, the marking tip of the pen will extend against one or the other edge of the graduated tape. As stated earlier, this feature is extremely useful allowing the user to place the tip of the pen against the graduations of each choice on the steel tape.

Figure 5:
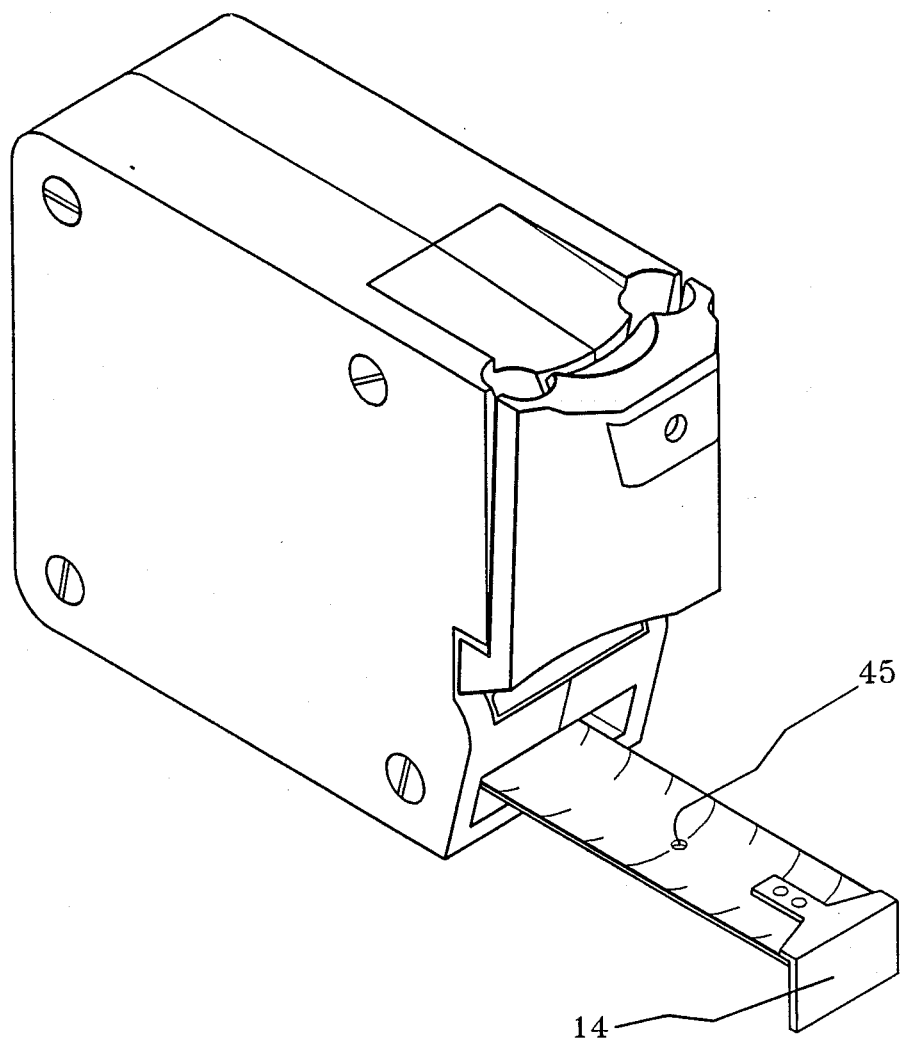
FIG. 5 is a perspective view of the free end of the graduated tape of the tape measuring according to the invention.

In a variant, the steel tape may be provided with a small opening 45, best shown in FIG. 5, adjacent the tab 14 to enable the tape measuring device 10 to be used for tracing circles. At this end, the graduated tap is extended from the housing 12 so that the distance separating the opening 45 adjacent the tab 14 and the tip of the pen or pencil in the holder 18 corresponds to the radius of the circle to be traced. Then, the tip of a pen or pencil is passed through the opening 45 and it is applied on the surface on which the circle is to be traced, where the center of the circle is to be located. By rotating the housing 12 about the pen or pencil location at the center of the circle, the pen or pencil in the holder 18 traces the circumference thereof.

Although the invention has been described above with respect to one specific form, it will be evident to persons skilled in the art that it may be refined and modified in various ways. It is therefore wished to have it understood that the present invention should not be limited in interpretation except by the terms of the following claims.

I claim:

1. A tape measuring device comprising:
a hollow housing defining a front wall having a lower portion formed with a slot therein;
an elongated tape wound into said housing, having at least one longitudinal graduated edge, and having a free end protruding outside the hollow housing through the said slot; and
a holder for a marking device having a marking tip, said holder including an arm hingedly mounted on said housing outside the same and facing said front wall above said slot, said arm and front wall defining between them a seat for receiving the marking device, and said seat comprising means for so positioning said marking device that its marking tip lies against said graduated edge in front of said slot but remotely therefrom when said tape is at least partially pulled out of said housing.

2. A tape measuring device comprising:
a housing;
an elongated tape wound into the housing, having a free end, and having first and second longitudinal graduated edges;
an opening formed into the housing and through which the free end of the elongated tape protrudes on the outside of said housing; and
a holder for a marking device having a marking tip, said holder including an arm hingedly mounted on said housing above said opening, the said arm and housing defining between them a seat for receiving the marking device, said seat being structured to establish two different positions for said marking device, namely a first position in which said marking tip extends adjacent said first graduated edge and a second position in which the said marking tip extends adjacent the said second graduated edge when said elongated tape is at least partially pulled out of the housing through the said opening.

3. A tape measuring device comprising:
a housing;
an elongated tape wound into said housing, having a free end, and having at least one longitudinal graduated edge;
an opening formed into said housing through which the free end of said tape protrudes on the outside of the housing;
a holder for a marking device having a marking tip, said holder including an arm hingedly mounted to said housing above said opening, said arm and said housing defining between them a seat for receiving said marking device wherein the marking tip thereof extends adjacent said longitudinal graduated edge of said tape when the latter is at least partially pulled out of said housing, said holder further comprising resilient means coupled to said housing and to said arm for urging said arm toward said housing with the marking device received into said seat.

4. A tape measuring device as defined in claim 3, wherein said resilient means is a coil spring.

5. A tape measuring device as defined in claim 1, wherein the positioning means of said seat includes a V-shaped recess formed in said front wall outside the housing and above said slot for receiving said marking device.

6. A tape measuring device as defined in claim 1, further comprising an opening formed in said tape at a given distance from the free end thereof for receiving a marking tip of a marking device.

7. A tape measuring device as defined in claim 2, wherein said elongated tape comprises along the first longitudinal edge thereof metric graduations and along the second longitudinal edge thereof imperial graduations.

8. A tape measuring device comprising:
a housing;
an elongated tape wound into the housing, having a free end, and having first and second longitudinal graduated edges;
an opening formed into said housing and through which the free end of the elongated tape protrudes on the outside of said housing;
first and second elongated grooves for receiving a marking device with a marking tip, said grooves being formed on the housing above said opening and establishing two positions for said marking device, namely a first position in which the marking device is received in the first groove and said marking tip lies adjacent the said first graduated edge when said tape is at least partially pulled out of the housing through said opening, and a second position in which the marking device is received in the second groove and said marking tip lies adjacent the said second graduated edge when said tape is at least partially pulled out of the housing through the said opening; and
an arm pivotally mounted on said housing for retaining said marking device in either one of said first and second grooves.

9. A tape measuring device comprising;
a housing;
an elongated tape wound into said housing, having a free end, and having at least one longitudinal graduated edge;
an opening formed into said housing and through which the free end of said elongated tape protrudes on the outside of the housing;
an arm pivotally mounted on said housing above said opening;
an elongated groove for receiving a marking device with a marking tip, said groove being formed on said housing, facing said arm, and being so oriented that when said marking device is received in said groove said marking tip lies adjacent the longitudinal graduated edge of said tape; and
a coil spring coupled to said housing and to said arm to urge said arm toward said housing with the marking device in said groove to thereby retain said marking device into said groove.

10. A tape measuring device as defined in claim 9, wherein said arm includes an opening for receiving therethrough said marking device.

11. A tape measuring device as defined in claim 8, in which said arm is formed with third and fourth elongated grooves, wherein in its first position the marking device is received by the first and third grooves and in its second position the marking device is received by the second and fourth grooves.

12. A tape measuring device as defined in claim 2, in which said marking device is elongated, and in which said positioning means of the seat comprises an elongated groove on at least one of said arm and front wall.

13. A tape measuring device as defined in claim 2, wherein said arm comprises upper and lower ends, said arm is hingedly mounted on the front wall through its lower end, and said arm has its upper end attached to the housing through spring means, whereby said arm can be pivoted on said housing by applying a force on its upper end to deform said spring means.

14. A tape measuring device as defined in claim 2, wherein said marking device is elongated and straight, said elongated tape has a longitudinal axis, and said marking device is lying into a plane perpendicular to said longitudinal axis of the tape.

* * * * *